United States Patent [19]

Kongshaug et al.

[11] Patent Number: 4,973,457
[45] Date of Patent: Nov. 27, 1990

[54] METHOD FOR THE REDUCTION OF NITROGEN OXIDE

[75] Inventors: Gunnar Kongshaug, Skien; Leif Hjørnevik, Porsgrunn; Erik Fareid, Stathelle; Øystein Nirisen, Porsgrunn, all of Norway

[73] Assignee: Norsk Hydro a.s., Oslo, Norway

[21] Appl. No.: 403,490

[22] Filed: Sep. 6, 1989

[30] Foreign Application Priority Data

Sep. 16, 1988 [NO] Norway .................................. 884147

[51] Int. Cl.$^5$ ...................... C01B 21/00; C01B 21/38; C01B 21/44; B01J 8/00
[52] U.S. Cl. .................................... 423/235; 423/239; 423/392
[58] Field of Search ................... 423/235, 235 D, 239, 423/239 A, 392, 393, 394

[56] References Cited

U.S. PATENT DOCUMENTS 3,489,515  1/1970  Jockers et al. ...................... 423/235

FOREIGN PATENT DOCUMENTS 8006262  4/1981  Netherlands ........................ 423/235

Primary Examiner—Gregory A. Heller
Attorney, Agent, or Firm—Wenderoth, Lind & Ponack

[57] ABSTRACT

The present invention relates to a method of reduction of nitrogen oxides in gas mixtures, especially the removal/decomposition of nitrogen oxide in hot combustion gases. The hot gas mixture which contains $N_2O$ is given a retention time of 0.1–3 seconds before being cooled down. About 90% of $N_2O$ is thereby decomposed to $N_2$ and $O_2$. A hot gas mixture formed by catalytic combustion of ammonia is given a retention time of 0.5–2 seconds before it is cooled in a heat recovery unit. The combustion gases can also be brought in contact with a metal or metal oxide catalyst for selective decomposition of the $N_2O$.

4 Claims, 2 Drawing Sheets

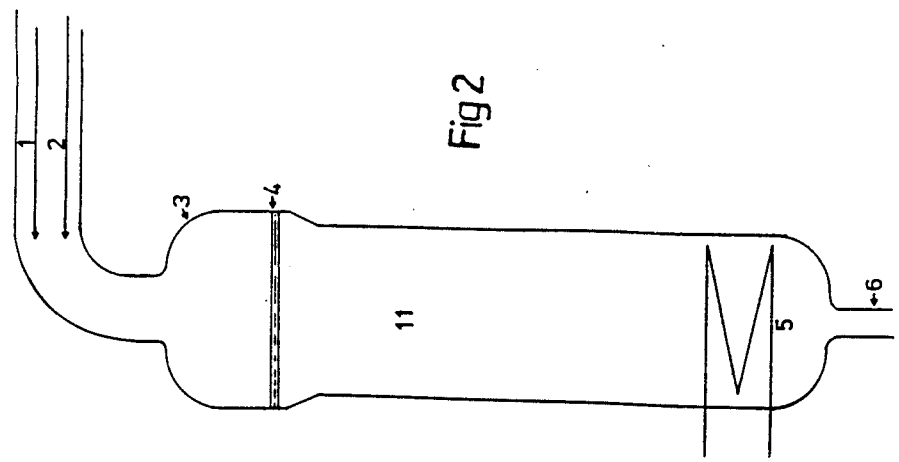
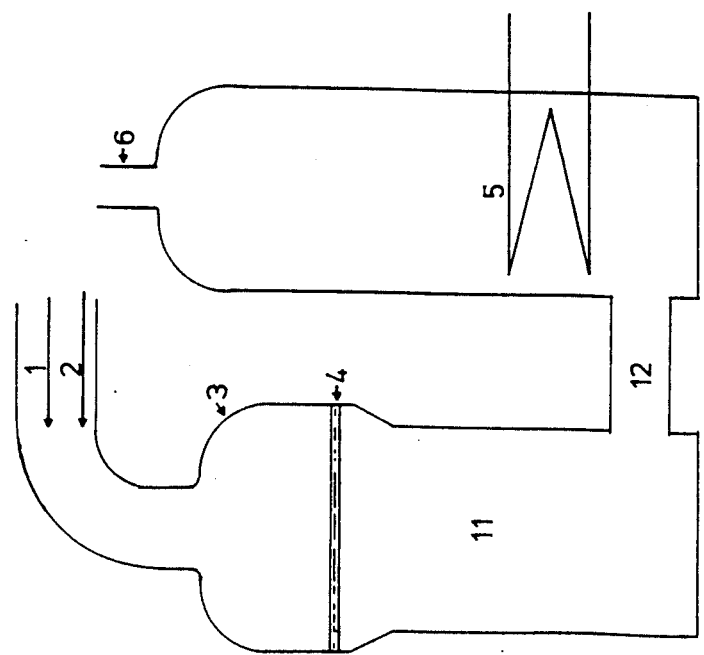

METHOD FOR THE REDUCTION OF NITROGEN OXIDE

BACKGROUND OF THE INVENTION

The present invention relates to the reduction of dinitrogen oxide which, for instance, is formed during the catalytic combustion of ammonia and oxygen to nitrogen oxides, which thereupon are cooled in a heat recovery unit and then absorbed in water and/or diluted nitric acid.

Nitric acid is manufactured by catalytic combustion of ammonia with oxygen and subsequent absorption of thereby formed nitrogen oxides in water and/or diluted nitric acid. In modern pressure absorption units one has obtained a substantial reduction of the nitrogen oxide ($NO_x$) emission in the effluent gases. The effluent gas from the most efficient absorption units contains only about 200 ppm $NO_x$. It is also known to apply catalytic decomposition of nitrogen oxides to nitrogen and water by reacting $NO_x$ with ammonia over a catalyst in order to meet the environmental emission requirements.

During the catalytic combustion of ammonia there is mainly formed NO and $NO_2$, but 1-2% of the ammonia is converted to dinitrogen oxide ($N_2O$). Investigations have shown that $N_2O$ does not react or become absorbed in the subsequent process. This implies that all the $N_2O$ formed during the combustion leaves the plant with the effluent gas. Lately it has begun to be determined whether or not $N_2O$, in spite of the fact that it is not very reactive, or possibly just because of its long life time in the atmosphere, can represent detrimental environmental effects. Theoretical model tests indicate that $N_2O$ can contribute to the destruction of the ozone layer in the atmosphere.

$N_2O$, also called laughing gas, is supplied in anesthetic gas in hospitals, and for such small volumes of gases having a high concentration of $N_2O$, it is known to decompose $N_2O$ catalytically. It is, for instance from Japanese patent application No. 55031463, known to perform such decomposition at 150°-550° C. over a platinum catalyst.

It has been further reported in some theoretical studies in the literature about the decomposition of $N_2O$. Decomposition of $N_2O$ is, for instance, used as a model reaction for studying catalysts for selective oxidation. These studies are, however, related to small volumes of gas mixtures having high $N_2O$ concentration and not to technical units or nitric acid production and the operating conditions which must be applied.

W. M. Graven, Journal of American Chemical Soc. 81, 6190 (1959) has reported kinetic studies of homogeneous decomposition of $N_2O$ at 800°-1000° C. In this report it is claimed that the reaction is of first order with regard to $N_2O$ and that NO has a certain accelerating effect and $O_2$ a retarding effect. Both decomposition to $N_2+O_2$ and to $NO_2$, was further observed but the decomposition to $N_2+O_2$ was dominant. The first order rate constant is stated to be:

$k = 2.1 \cdot 10^9 \exp(-220\,000/RT) \text{ sec}^{-1}$

R is in Joule/mol °K. and

T is in degrees °K.

These measurements are, however, carried out in a reaction vessel of 5.6 ml on a $N_2O$ gas diluted with helium. Small amounts of NO and $O_2$ were added for studying their influence on the $N_2O$ decomposition. At increasing NO concentrations it is reported that the reaction $N_2O+NO=NO_2+N_2$ rapidly became dominant.

There is accordingly, no clear guidance to be found in the literature about how one in a technically and economically acceptable way can selectively remove or decompose $N_2O$ from those gas mixtures being present in the nitric acid plant and under those operating conditions which there exist.

SUMMARY OF THE INVENTION

The object of the present invention was to remove or decompose a substantial part of the $N_2O$ formed during combustion of ammonia in a nitric acid plant.

A further object was to carry out this decomposition without having to alter substantially the operating conditions during combustion or absorption. It was preferably desired to perform the decomposition at the earliest possible stage in the process.

As mentioned above, there are several known catalysts for the decomposition of $N_2O$, but their selectivity is not known. The most active ones seem to be the nobel metal catalysts, which also are used for the combustion of ammonia. These are expensive catalysts, and the arrangement of such catalysts in the effluent gas from the absorption tower was not considered to be attractive. The reason for this is mainly that the $N_2O$ concentration is low there and the temperature is also relatively low, resulting in a correspondingly low rate of conversion. It would also be necessary to use large amounts of catalyst in order to obtain the desired decomposition of $N_2O$ with the large volumes in question.

The inventors therefore started their investigation in view of obtaining the selective decomposition of $N_2O$ in the combustion unit itself. Commercial ammonia combustion is usually performed at 1125°-1229° K. over nobel metal catalysts. The hot reaction gases are then rapidly cooled in a heat recovery unit in the combustion unit right after the catalyst package, which usually comprises several nobel metal gauzes and recovery gauzes for nobel metal, first of all platinum.

Based on the indications in the literature that $N_2O$ will decompose relatively rapidly at those operating temperatures present in the combustion unit, it was started investigations in a pilot plant in order to find out whether the decomposition was selective with regard to $N_2O$. One would also find out how rapid this decomposition was in the gas having the composition used in a commercial nitric acid plant, especially that gas mixture present just ahead of the heat recovery unit. These investigations were carried out by leading the gas mixture through, respectively, a steel pipe and a quartz pipe, using varying temperatures. It was surprisingly found that in the quartz pipe the rate constant for the decomposition of $N_2O$ was about five times as high as reported in the above-referenced article. It was further found that, contrary to the indication in this article the presence of relatively large amounts of NO had no substantial influence. The decomposition was very selective with regard to $N_2O$, as registered changes of NO and $NO_2$, concentration during 1-2 seconds at the actual temperature were almost negligible. There were also carried out experiments with relatively low temperatures and it was, for instance, found that at 960° K. the decomposition of $N_2O$ was as low as 1%. The experiments carried out in a steel pipe, showed that the decomposition there was far less selective with regard to $N_2O$, as already 1 second at 1100° K., 7.2% of the $NO+NO_2$ content of the gas was decomposed.

The inventors found that from these investigations and further tests, at least 90% of N₂O formed during the combustion could be removed/decomposed selectively in the combustion unit if it was secured that the combustion gases were given sufficient retention time at high temperature, i.e. between the catalyst package and the heat recovery unit. Increased retention time in this area implies that the distance between the catalyst package and the heat recovery unit has to be increased.

In order to reduce the retention time for desired decomposition of N₂O, a metal or metal oxide catalyst which selectively decomposes N₂O after the catalyst package can be installed.

BRIEF DESCRIPTION OF THE DRAWINGS

The present invention is further explained below in connection with the accompanying examples and figures, in which:

FIG. 2 shows a combustion unit for application of the invention; and

FIG. 3 shows a different design of the combustion unit shown in FIG. 2.

DETAILED DESCRIPTION OF THE INVENTION

Figure 1:
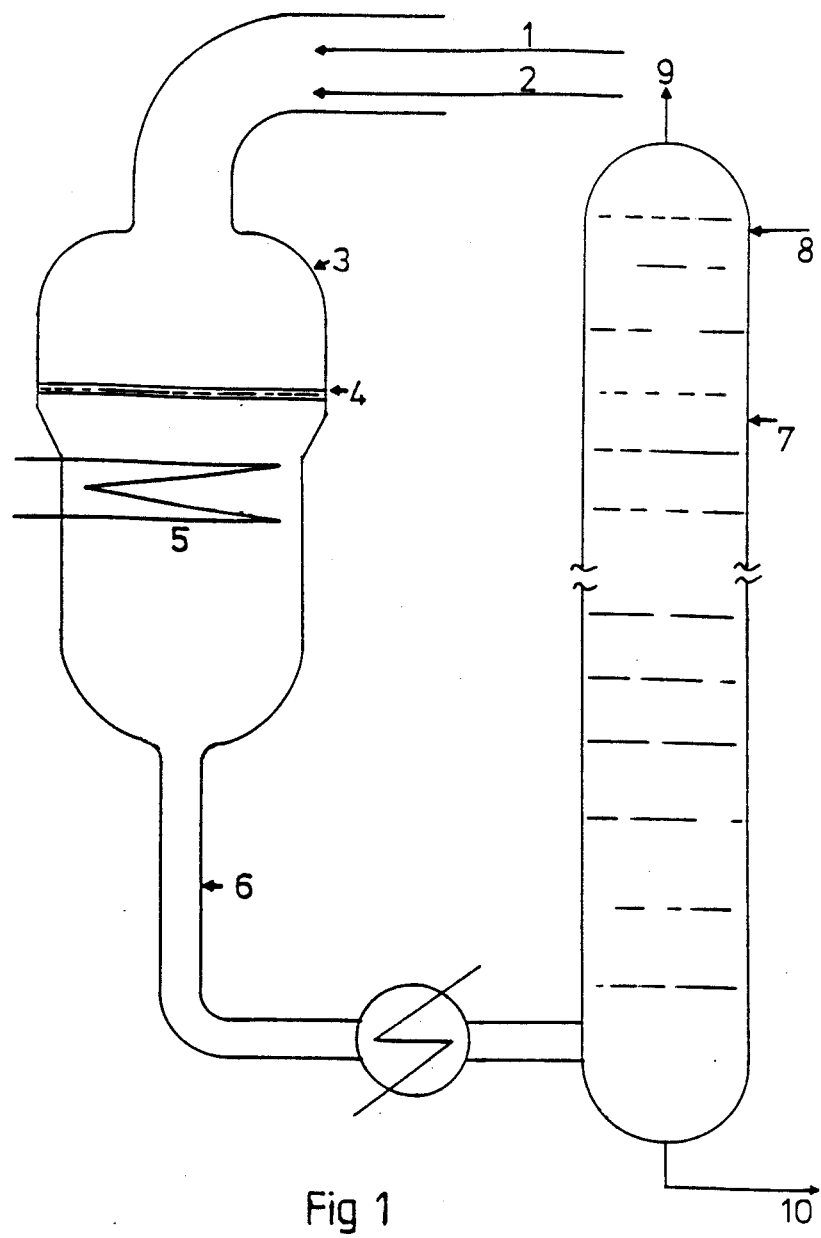
FIG. 1 shows schematically a conventional ammonia combustion unit connected to an absorption tower.

FIG. 1 shows schematically a conventional nitric acid unit comprising a combustion unit 3, the upper part of to which ammonia 1 and oxygen/air 2 are supplied.

The gases are converted catalytically in the gauze package 4 and thereupon cooled in the heat recovery unit 5 before they are transported through pipe 6 to an absorption tower 7 in which the nitrogen oxides are absorbed countercurrently. Water is supplied to pipe 8 and product acid removed through pipe 10. The effluent gases containing non-absorbed nitrogen oxides leave the tower through pipe 9.

FIG. 2 shows a combustion unit 3 for carrying out the method according to the invention. The reaction gases leave the unit 3 through pipe 6 to a conventional absorption tower (not shown on the figure). Between the gauze package 4 and the heat exchanger 5 there is arranged an extra volume 11 which results in that the reaction gases get an extra retention time at high temperature, substantially the reaction temperature, before they are cooled down and transported to the absorption tower.

FIG. 3 shows in principle the same type of combustion unit as shown in FIG. 2, i.e. having an extra volume 11. But in order to obtain a low height for the combustion unit it is divided in two and the heat recovery unit 5 is now arranged in a separate unit 12. There is hereby obtained the same retention time for the hot reaction gases as in the unit according to FIG. 2, but the height of the complete combustion unit is substantially lower, and that might in several cases be of importance, especially for the restructuring of old units.

EXAMPLE 1

This example shows investigations of the nitrogen oxide decomposition in a gas mixture corresponding to that present right after the catalyst package in an ammonia combustion unit. The tests were carried out at 5 bar in a steel pipe and the gas mixture was given a retention time of 1 second at the actual temperatures. The amounts NO+NO₂ and N₂O are stated at the inlet and outlet of the adiabatic reactor (steel pipe). The remaining gases in the mixture are essentially N₂.

TABLE 1

| Test No | Temp. °K. | Vol. % NO + NO₂ in | Vol. % NO + NO₂ out | % decomp. NO + NO₂ | ppm N₂O in | ppm N₂O out |
|---|---|---|---|---|---|---|
| 1 | 1100 | 9.46 | 9.40 | 0.6 | 1700 | 1030 |
| 2 | 1118 | 9.51 | 9.41 | 1.1 | 1678 | 890 |
| 3 | 1141 | 9.87 | 9.53 | 3.4 | 1495 | 584 |
| 4 | 1153 | 10.00 | 9.48 | 5.2 | 1482 | 464 |
| 5 | 1161 | 10.10 | 9.37 | 7.2 | 1303 | 353 |

Decomposition of NO+NO₂ during the tests in the steel pipe were so large that further tests in the steel pipe were stopped. It seemed that the steel pipe had a certain catalytic effect with regard to decomposition of NO.

EXAMPLE 2

This example shows investigations carried out in a quartz pipe on the same type of gas mixture as in Example 1. The tests were carried out with a retention time of, respectively, 1 and 2 seconds. Decomposition of NO+NO₂ was not registered and in the table the amount for these components are therefore given for the inlet gas.

TABLE 2

| Test No | Temp. °K. | Vol. % NO + NO₂ | ppm N₂O in | ppm N₂O out | Retention time seconds |
|---|---|---|---|---|---|
| 6 | 1100 | 9.46 | 1700 | 1101 | 1 |
| 7 | 1118 | 9.50 | 1680 | 893 | 1 |
| 8a | 1141 | 9.88 | 1500 | 558 | 1 |
| 8b | 1141 | 9.88 | 1511 | 220 | 2 |
| 9a | 1153 | 10.02 | 1453 | 428 | 1 |
| 9b | 1153 | 10.02 | 1505 | 135 | 2 |
| 10a | 1161 | 10.01 | 1389 | 340 | 1 |
| 10b | 1161 | 10.01 | 1217 | 79 | 2 |
| 11a | 1175 | 10.04 | 1117 | 170 | 1 |
| 11b | 1175 | 10.04 | 1109 | 30 | 2 |

As can be seen from Table 2, there was obtained selective decomposition of N₂O to N₂ and O₂ and at a temperature corresponding to the actual operating temperature during ammonia combustion, for instance 1175° K. At a retention time of 1 second about 84.8% was decomposed, and at a retention time of 2 seconds about 97.3% was decomposed. Based on these investigations one arrived at the following rate constant k for the homogeneous decomposition:

$k = 4.23 \cdot 10^9 \exp(-210700/RT) \text{ sec}^{-1}$

R is in Joule/mol °K.

T is in degrees °K.

This rate constant was found to be larger and increasingly stronger with increasing temperature than the theoretical estimates reported in the literature. The fact that decomposition proved to be very selective and very rapid makes it practically possible to give the combustion gases an extra retention time sufficient for decomposing about 90% of the N₂O formed during the ammonia combustion. This implies in practice that in a burner unit an extra volume 11 can be arranged as shown in FIGS. 1 and 2.

Further investigations showed that at 1063° K. about 30% of the N₂O was decomposed already after 0.2 seconds and it was found that substantial amounts of N₂O in the warm effluent gases could be removed by giving them a retention time of 0.1–3 seconds. For decomposition of N₂O in the ammonia combustion unit it should be applied a retention time of 0.5-2 seconds at the existing temperatures.

One has by the present invention been able to remove substantially all of the $N_2O$ formed in connection with nitric acid production. This decomposition of $N_2O$ can be carried out without the reduction of the ammonia combustion yield or the efficiency of the nitric acid plant. The method according to the invention can also be carried out without altering the operating conditions for the ammonia combustion or the absorption of nitrogen oxides. The invention can further be applied on other warm gas mixtures from which it is desired to remove $N_2O$.

We claim:

1. A method of reduction of dinitrogen oxide formed during catalytic combustion of ammonia and oxygen to nitrogen oxides in a combustion unit, which are then cooled in a heat recovery unit and absorbed in an absorption unit having water or diluted nitric acid or both therein, said method comprising giving the high temperature combustion gases formed during said catalytic combustion a retention time of 0.1-3 seconds before said high temperature combustion gases are cooled by said heat recovery unit.

2. The method of claim 1, wherein:
said high temperature combustion gases formed during said catalytic combustion are given a retention time of 0.5-2 seconds in said combustion unit before said high temperature combustion gases are cooled by said heat recovery unit.

3. The method of claim 1, wherein:
said high temperature combustion gases are brought in contact with a metal or metal oxide catalyst for selective decomposition of $N_2O$.

4. The method of claim 1, wherein:
gases leaving said absorption unit are brought in contact with a metal or metal oxide catalyst for decomposition of $N_2O$.

* * * * *